United States Patent

Myers

[11] 3,835,198
[45] Sept. 10, 1974

[54] PRODUCTION OF PARAXYLENE
[75] Inventor: John W. Myers, Bartlesville, Okla.
[73] Assignee: Phillips Petroleum Company, Bartlesville, Okla.
[22] Filed: Aug. 29, 1968
[21] Appl. No.: 756,144

[52] U.S. Cl............................ 260/674 A, 260/668 A
[51] Int. Cl.......................... C07c 7/02, C07c 15/08
[58] Field of Search.................... 260/674 A, 668 A

[56] References Cited
UNITED STATES PATENTS

| | | | |
|---|---|---|---|
| 2,532,276 | 12/1950 | Birch et al. | 260/674 |
| 2,741,646 | 4/1956 | Clark | 260/674 |
| 3,078,318 | 2/1963 | Berger | 260/668 |
| 3,198,846 | 8/1965 | Kelso | 260/674 |
| 3,538,173 | 11/1970 | Berger et al. | 260/668 |
| 3,562,344 | 2/1971 | Hengstebeck | 260/668 |

Primary Examiner—Delbert E. Gantz
Assistant Examiner—C. E. Spresser

[57] ABSTRACT

Improved separation and a high yield of p-xylene from a p-xylene-containing isomerizate by fractional crystallization are obtained by removing napthenes, and optionally paraffins and light and heavy ends, from the isomerizate, and recycling the naphthenes to the isomerization zone.

10 Claims, 1 Drawing Figure

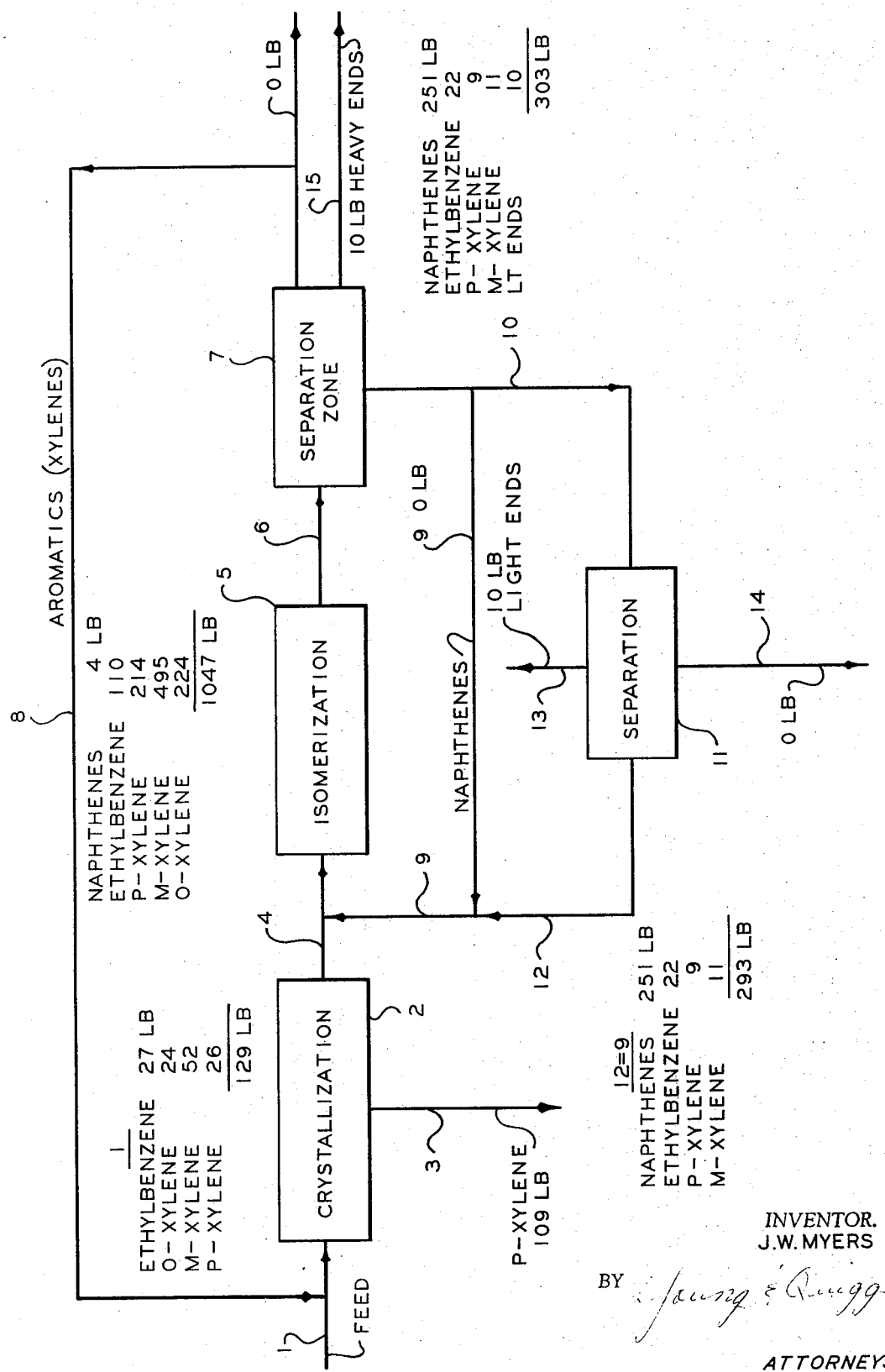

PRODUCTION OF PARAXYLENE

This invention relates to the production of paraxylene. More specifically, the invention relates to a combination operation in which para-xylene is recovered from a concentrate containing the same by a fractional crystallization process. Further, the invention relates to a combination operation in which mother liquor as obtained from the fractional crystallization is isomerized. Still further, the invention relates to an operation in which an isomerization is effected to produce a para-xylene-containing concentrate.

In one of its concepts the invention provides a method for the production of para-xylene which comprises fractionating isomerization zone effluent to remove therefrom naphthenes subjecting the naphthene-free fraction to fractional crystallization, and recycling the naphthenes to the isomerization zone. In another of its concepts the invention provides an operation in which mother liquor from a fractional crystallization zone is subjected to isomerization to produce additional feed for the fractional crystallization, in which operation the isomerization effluent is fractionated to remove naphthenes therefrom prior to passing an aromatics stream thus obtained to the fractional crystallization step. Still, in a further concept, the invention provides a method for the separation of para-xylene by fractional crystallization from a naphthene-aromatic mixture containing the same by (1) separating naphthenes by fractionation or solvent extraction or other means, (2) feeding the aromatic concentrate thus obtained to a crystallizer, and (3) re-cycling the separated napthenes directly to isomerization. In a still further concept of the invention, in the operation there is provided a step for the separation of the light ends and at least a portion of paraffins which are formed as may be desired when a substantial amount thereof are in the isomerization effluent.

Isomerization of xylenes with a catalyst having hydrogenating-dehydrogenating activity at conditions favoring the existence of a minor amount of naphthenes is known in U.S. Pat. No. 2,784,241, issued June 6, 1951. A fractional crystallization process is described in U.S. Pat. NO. 2,931,841 issued Apr. 5, 1960. Another fractional crystallization operation is set forth in U.S. Pat. No. 2,886,587, issued May 12, 1959. Another patent dealing with the production of xylenes is U.S. Pat. No. 2,741,646, issued Apr. 10, 1956. The disclosures of these patents are incorporated herein by reference and are pertinent to different degrees or extents as one skilled in the art in possession of this disclosure will understand.

Another patent dealing with the separation of xylene isomers by crystallization and distillation in U.S. Pat. No. 3,067,270, issued Dec. 4, 1962, whose disclosure is also incorporated by reference principally to show general background and utility but also for the facts it contains. Some other patents whose disclosures are also incorporated by reference are U.S. Pat. No. 2,988,575, issued June 13, 1961; U.S. Pat. No. 2,837,581, issued June 3, 1958; U.S. Pat. No. 3,113,978, issued Dec. 10, 1963; U.S. Pat. No. 2,656,398, issued Oct. 20, 1953; U.S. Pat. No. 2,532,276, issued Dec. 5, 1950 and U.S. Pat. No. 2,890,252, issued June 9, 1959. The patents which have been included herein are whose disclosures have been incorporated by reference are those which are brought to the attention of the reader to more completely familiarize him with this art. There are other patents in this field as one skilled in the art will know. The foregoing are but a few of the available patents. No complete listing is intended. The patents are helpful to better understand the contribution made by the instant inventor and to provide a situs for the claimed invention under 35 U.S.C. 112.

The isomerization of alkylaromatic hydrocarbons employing so-called dual function catalysts is described in Isomerization of Alkyl-Aromatic Hydrocarbons, presented to the Division of Petroleum Chemistry, American Chemical Society, New York Meeting, September 11–17, 1954, pages 127 through 134. Page 129, lines 46 and 47 state: "Operation to maximize the intermediate hydrogenated state would increase the conversion of ethylbenzene to xylene."

It has now occurred to me that separation from the isomerization effluent of the naphthenes, as by fractionation, with recycle to the isomerization reactor will permit increasing the para-xylene content of the feed to the crystallizer to a value well within the range taught to be desirable by U.S. Pat. No. 2,931,841, above-mentioned. Thus, I have discovered that fractionating a liquid isomerizate containing 16.1 weight percent para-xylene and 21.2 weight percent naphthenes, and taking approximately 24 weight percent of the feed overhead yields an overhead containing 86.6 weight percent naphthenes and a kettle product containing only 0.4 weight percent naphthenes and 20.4 weight percent of para-xylene. Further, blending the overhead fraction with $C_8$ aromatics to give an isomerization feed having a composition approaching that of the naphthene-aromatic equilibrium results in a reduction in aromatic hydrogenation during isomerization and also in extensive isomerization of the ethylbenzene as well as the xylenes.

It is an object of this invention to produce para-xylene. It is another object of this invention to provide an operation for isomerizing xylenes to produce para-xylene. It is a further object of this invention to provide a process for the production of para-xylene in an improved manner in a fractional crystallization operation. It is a still further object of the invention to so-treat isomerization reactor effluent in a combination fractional crystallization and isomerization step operation in the production of para-xylene as to improve the operation of the fractional crystallizer. In a still further object of the invention it is concerned with improving yield of para-xylene from such a process. Still further it is an object of the present invention to provide in a combination operation in which a fractional crystallizer is employed followed by an isomerization to so conduct the isomerization as to convert ethylbenzene and other than para-xylene to p-xylene with a relatively small net hydrogenation to permit a more accurate temperature control.

Other aspects, concepts and objects as well as the several advantages of the invention are apparent from a study of this disclosure, the drawing and the appended claims.

According to the present invention, there is provided a process for the production of para-xylene by fractional crystallization from a liquor which contains ethylbenzene, para-xylene, meta-xylene and ortho-xylene, and isomerization of the aromatics in the remaining liquor to increase para-xylene content, the improvement which comprises subjecting the isomerization effluent to a separation operation to obtain therefrom a stream rich in para-xylene and a stream rich in naphthenes, the stream rich in para-xylene being low in naphthene content and the stream rich in naphthenes being low in para-xylene content, passing the stream rich in para-xylene to said fractional crystallization operation and passing the stream rich in naphthenes directly to said isomerization.

By operating as described herein, with use of a dual function catalyst and with recycle of the napthenes directly to the isomerization zone only a relatively small amount of net hydrogenation occurs and therefore temperature control is much easier than heretofore. The use of dual function catalyst and operation under conditions to permit some naphthenes to exist permits isomerization of ethylbenzene to xylenes and therefore prevents ethyl benzene build-up. Any dual function catalyst capable of isomerizing both ethylbenzene to xylenes and xylenes to equilibrium or near equilibrium can be used. Broadly, this includes the metals, oxides, and sulfides of Groups VB, VIB and VIII and mixtures thereof, usually supported on materials such as clay, alumina, silica-alumina, mol sieves and the like. Preferred catalysts are platinum supported on alumina treated with halogen or a halogen acid such as fluorine, HF, chlorine, HCl, and the like, on silica-alumina, on boria-alumina, on an acidic mol sieve, and the like. Other platinum-group and palladium-group metals can be used in place of or in addition to platinum. Preferably the metal concentration is 0.1 to 2 weight percent of the total catalyst. The periodic table referred to is that in Handbook of Chemistry and Physics, published by Chemical Rubber Company, 45th Edition (1964), page B-2.

Operating conditions that can be used in the isomerization step are:

|  | Broad Range | Preferred Range |
| --- | --- | --- |
| Temperature, °F. | 600–850 | 700–800 |
| Pressure, psig | 100–1500 | 100–500 |
| Feed, lhsv* | 0.5–10 | 1–5 |
| H$_2$/feed, mol ratio | 1–20 | 3–8 |

*liquid hourly space velocity

Operating conditions for the fractional crystallization step and for the separation steps are well known and are recited in the art hereinbefore incorporated by reference.

As indicated in column 4, lines 3–18 of U.S. 2,931,841, hereinbefore incorporated by reference, use of a feed that contains greater than 20 weight percent para-xylene for fractional crystallization results in the production of larger, more easily filterable crystals. Such a feed is produced by the process of this invention.

The drawing shows diagramatically an operation according to an embodiment of the invention.

Referring now to the drawing, a fresh C$_8$ aromatic feed 1 and a recycle C$_8$ aromatic stream 8 are passed to a fractional crystallizer 2 in which para-xylene is removed at 3 as a desired product. Mother liquor is passed by 4 to isomerizer 5 and by 6 from isomerizer 5 to separation zone 7. In the separation zone the naphthenes are substantially completely separated, as shown by data herein, from the effluent so that there is returned an aromatics (xylenes) feed by 8 to crystallizer 2. From the separation zone a naphthenes-containing stream is passed by 9 to isomerizer 5. As desired, particularly when there is a build-up of paraffins, some or all of the naphthenes-containing stream can be passed by 10 to paraffin and light ends separation zone 11, and by 12 and 9 to isomerizer 5 after separation of the light ends and paraffins, which are removed respectively at 13 and at 14.

Although fractionation has been set forth as the preferred manner of obtaining the separations in zones 7 and 11, it is within the scope of the invention to use other separation means well known in the art such as solvent extraction, mol sieve separation, and the like.

EXAMPLE

A platinum-fluorine-alumina catalyst containing 0.37 weight percent platinum and 3.4 weight percent fluorine was used to isomerize a C$_8$ aromatic feed at approximately 737F, 1 LHSV, 5 hydrogen/feed mol ratio and 200 psig. The feed, which simulated a mother liquor stream from a crystallizer separating p-xylene, had the weight percent composition: ethylbenzene 22.8, p-xylene 12.1, m-xylene 42.6, o-xylene 22.5. The liquid product contained 16.1 weight percent p-xylene. A portion of the product was fractionated in a 25 mm X 36-inch hypercal column and approximately 24 weight percent of the products taken overhead. Analyses of the total product, overhead and kettle products were given as follows:

| Composition, Wt. % | Total Product | Overhead | Kettle |
| --- | --- | --- | --- |
| Naphthenes | 21.2 | 86.6 | 0.4 |
| Ethylbenzene | 9.7 | 7.1 | 10.5 |
| p-xylene | 16.1 | 2.8 | 20.4 |
| m-xylene | 37.1 | 3.5 | 47.3 |
| o-xylene | 15.9 | 0.0 | 21.4 |
| Total | 100.0 | 100.0 | 100.0 |

Comparative fractional crystallization tests, made as previously described in U.S. Pat. No. 2,931,841, indicate that using larger, more easily filterable crystals and a higher yield of p-xylene are obtainable with the feed of my invention.

Reasonable variation and modification are possible within the scope of the foregoing disclosure, the drawing and the appended claims to the invention the essence of which is that improved separation and a high yield of p-xylene from a p-xylene-containing isomerizate by fractional crystallization are obtained by removing naphthenes, and optionally paraffins and light and heavy ends, from the isomerizate, and recycling the naphthenes to the isomerization zone.

I claim:

1. In a process for the production of para-xylene by its separation in a fractional crystallization operation from a liquor which contains ethylbenzene, p-xylene, m-xylene and o-xylene and in which after the separation the remaining liquor is subjected to isomerization in presence of an isomerization catalyst under isomerization conditions, including the presence of hydrogen to increase its p-xylene content, the improvement which comprises subjecting the isomerization effluent to a separation operation to obtain therefrom a stream rich in p-xylene containing at least about 20 weight percent p-xylene and a stream rich in naphthenes containing at least about 50 weight percent naphthenes, the stream rich in p-xylene being low in naphthene content and the stream rich in naphthenes being low in p-xylene content, passing the stream rich in p-xylene to said frictional crystallization operation and passing the stream rich in naphthenes to said isomerization and therein subjecting the same to conditions of isomerization therein to convert in the presence of said naphthenes ethylbenzene and xylenes to additional p-xylene.

2. A process according to claim 1 wherein isomerization a platinum-fluorine-alumina catalyst is employed.

3. A process according to claim 1 wherein the effluent from the isomerization is fractionated to yield an overhead product containing at least about 50 weight percent naphthenes and less than about 5 weight percent p-xylene and a kettle product containing less than about 5 weight percent naphthenes and at least about 18 weight percent p-xylene.

4. A process according to claim 3 in which light ends and paraffins are separated from the naphthenes-rich overhead product.

5. In a process for producing paraxylene wherein a feed rich in $C_8$ aromatics and hydrogen are passed through an isomerization zone maintained at suitable isomerization conditions and containing a suitable hydrogenation-dehydrogenation catalyst, whereby a substantially equilibrated mix of xylenes and naphthenes form in said zone, and then said mix of xylenes and naphthenes are withdrawn from the isomerization zone and the xylenes are passed through a fractional crystallization zone to separate paraxylene from other isomers of xylenes, the improvement comprising separating the naphthenes from the xylenes before said xylenes are passed into the fractional crystallization zone and recycling said naphthenes to the isomerization zone.

6. The process defined by claim 5 wherein separation of the xylene and naphthenes is achieved by fractional distillation.

7. The process defined in claim 5 wherein unseparated xylenes are withdrawn from the fractional crystallization zone and recycled to the isomerization zone.

8. In a process for the production of para-xylene by its separation in a fractional crystallization operation from a liquor which contains ethylbenzene, p-xylene, m-xylene and o-xylene and in which after the separation the remaining liquor is subjected to catalytic isomerization in contact with hydrogen to increase its p-xylene content, the improvement which comprises subjecting the isomerization effluent to a separation operation to obtain therefrom a stream rich in p-xylene and a stream rich in naphthenes, the stream rich in p-xylene being low in naphthene content and the stream rich in naphthenes being low in p-xylene content, passing the stream rich in p-xylene to said fractional crystallization operation and passing the stream rich in naphthenes to said isomerization.

9. A process according to claim 1 wherein the separation of the stream rich in naphthenes from the isomerization effluent is achieved by fractionation.

10. A process according to claim 1 wherein the separation of the isomerization effluent to yield said streams is accomplished by fractionation to provide an overhead stream containing at least 50 weight percent naphthenes and a kettle product having at least about 20 weight percent p-xylene.

* * * * *